March 9, 1937.  G. E. ANDRE  2,072,850
LIGHTNING ARRESTER AND METHOD FOR MAKING THE SAME
Filed Oct. 4, 1934  2 Sheets-Sheet 2
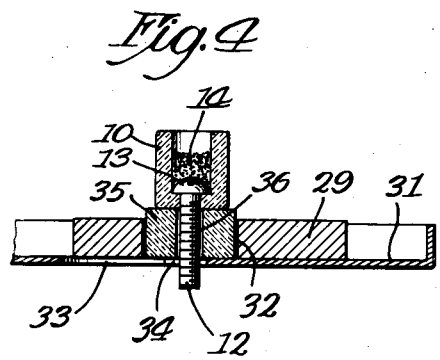
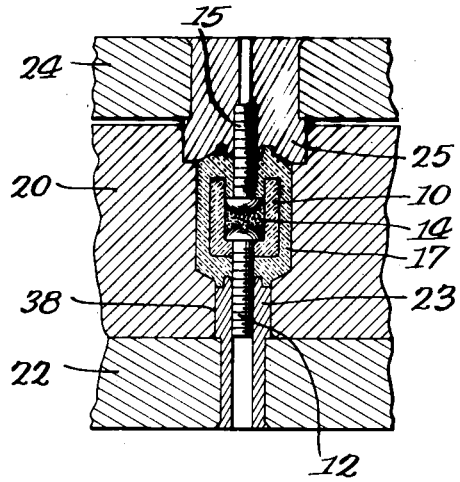
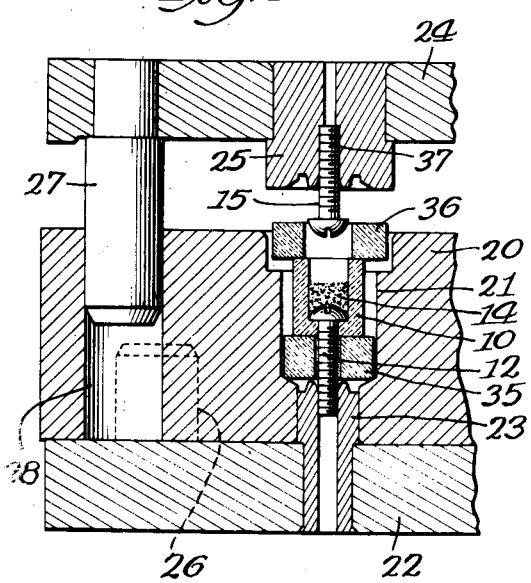
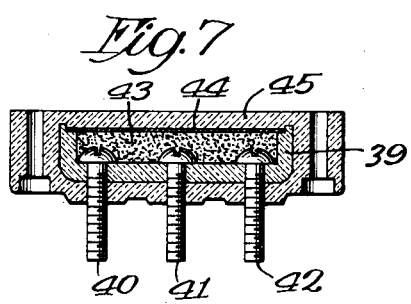
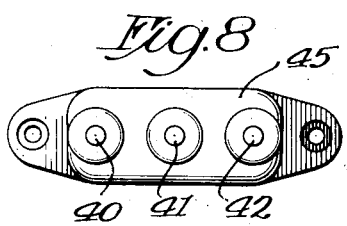
Inventor:
Gustaf E. Andre
By Fisher, Clapp, Soans & Pond
Attys.

Patented Mar. 9, 1937

2,072,850

UNITED STATES PATENT OFFICE 2,072,850

LIGHTNING ARRESTER AND METHOD FOR MAKING THE SAME

Gustaf E. Andre, Richmond, Ind., assignor to Belden Manufacturing Company, Chicago, Ill., a corporation of Illinois Application October 4, 1934, Serial No. 746,884

10 Claims. (Cl. 175—30)

This invention relates to an improved lightning arrester construction, the method for making the same, and important objects of the invention are to provide an efficient and durable lightning arrester designed mainly for the protection of radio aerials, although not restricted thereto; to provide a lightning arrester of higher efficiency than has been obtainable in conventional structures; to provide a lightning arrester which will be impervious to moisture and hence adapted to both inside and outside mounting without impairment of its operativeness or efficiency; to provide a convenient and economical method for producing lightning arresters embodying the invention; and to provide mechanism for facilitating such production.

Other objects and advantages of the invention will be understood by reference to the following specification and accompanying drawings (two sheets) wherein there is illustrated a lightning arrester embodying a selected form of the invention, a modification thereof, and a selected method and apparatus for producing one form of the product.

In the drawings:—

Figure 1:
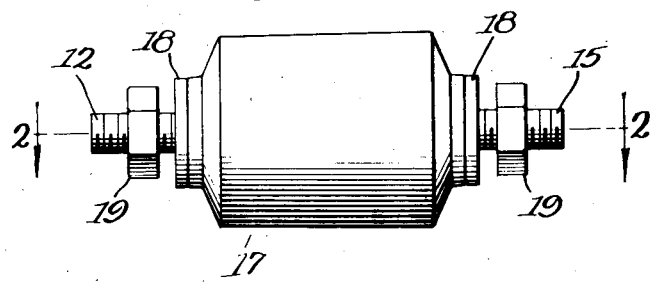
Fig. 1 is a side elevation of one form of lightning arrester embodying the invention.
Figure 2:
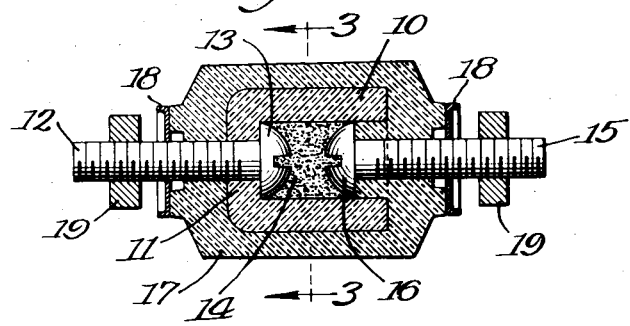
Fig. 2 is a section on the line 2—2 of Fig. 1.
Figure 3:
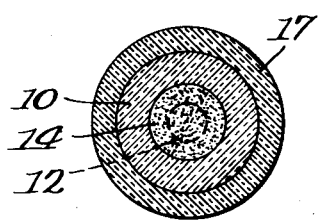
Fig. 3 is a section on the line 3—3 of Fig. 2.

Figs. 4, 5 and 6 are sections illustrating a selected method and apparatus for producing the lightning arrester illustrated in Figs. 1, 2 and 3; and Figs. 7 and 8 are a section and plan, respectively, of another form of lightning arrester embodying the invention.

Referring now to the drawings, and particularly to Figs. 1, 2 and 3, the form of lightning arrester there shown embodies a cup-like receptacle 10 preferably formed of porcelain or some other suitable insulating material which is hard and rigid. The bottom wall 11 of the receptacle is apertured to permit a terminal screw 12 to be seated therein with its head 13 located in the receptacle.

A quantity of powdered or granular material indicated at 14, preferably silicon carbide or Carborundum, or other material suitable for the purpose, is placed in the receptacle over the head 13 of the terminal 12. Another terminal screw 15 is arranged in axially aligned relation with the terminal 12 and has its head 16 disposed in the receptacle 10 in engagement with the granular material 14, and separated thereby from the terminal head 13.

A casing 17 of insulating material, preferably of Bakelite or similar moldable material is molded around the assembly consisting of the parts 10, 12, 14 and 15. The casing is molded under pressure so as to compress the granular material 14 and so as to cause intimate contact between the casing material and the shanks of the respective terminal members to produce a water-tight seal. It will be apparent that the casing formed as above explained will be an hermetically sealed casing and that the lightning arrester will be impervious to moisture.

In lightning arresters it has generally been the practice to provide a button or other shaped element of material which constitutes an insulator against low electrical voltages but which becomes a conductor for high voltages, for example, 500 volts and over. Such caked forms of material have been formed by mixing together silicon carbide or other material with a binder such as sodium silicate or other cementitious material. Such forms have been found to break down under the influence of moisture and their efficiency is somewhat lowered because of the presence of sodium silicate. In the described structure, the silicon carbide is used in its granular form and contains no cementitious binder, but is merely compacted between the heads of the terminals so as to obtain the desired conducting property. It will of course be understood that conductivity depends largely upon the compression of the material. In the described structure the pressure under which the casing is formed and under which the granular material is compacted may be as much as one or more thousand pounds per square inch.

At the opposite ends of the lightning arrester, and associated with the respective terminals, there are provided metallic cup-shaped washers 18, 18 and nuts 19, 19 for attaching ground and aerial conductors respectively to the terminals.

The lightning arrester shown in Figs. 1, 2 and 3 may be produced by the method and apparatus illustrated in Figs. 4, 5 and 6. The apparatus includes a die member 20 having one or more cavities such as indicated at 21, a bottom plate 22 which is equipped with a projecting element 23 designed to enter the lower end portion of the cavity 21 and an upper plate 24 which is equipped with a projecting member 25 adapted to enter the upper portion of the die cavity 21. The lower plate 22 is positioned with respect to the die member 20 through the agency of studs such as indicated at 26 carried by the lower plate and designed to enter suitable openings provided in the member 20. The upper plate 24 is similarly positioned with respect to the die member 20 through the agency of projecting pins such as 27 which enter guide openings 28 provided in the die member 20. It will be understood that the members 22 and 24 are removably associated with the member 20 and that the respective guide pins fit slidably in the openings provided in the member 20.

For loading the die 20, there is provided a loading tray (see Fig. 4) which consists of a plate member 29 and a bottom sheet 31 which is secured to the plate 29 in any suitable manner for sliding movement relative to the plate. The right hand end (Fig. 4) of the sliding sheet 31 is extended beyond the adjacent edge of the plate 29 as indicated at 31, to afford means for manipulating said sheet. The plate 29 is provided with an aperture 32 and the sheet 31 is provided with a similar aperture 33, which is normally out of register with the opening 32. At one side, the opening 33 is provided with a narrow notch or recess 34, which is approximately co-axially aligned with the opening 32.

The opening 32 is of such size as to be adapted to receive Bakelite or other moldable material in suitable form, for example, in the form of a biscuit 35, the said biscuit having a central aperture 36. An assembly consisting of a receptacle 10 and a terminal member 12 is then seated on top of the biscuit 35 with the terminal 12 projecting through the central aperture 36 of the biscuit and through the notch or recess 34 in the slidable sheet 31. A predetermined quantity of granular material 14 is next poured in the receptacle 10 on top of the terminal head 13.

The loading tray, loaded as above explained, is then positioned over the die member 20 with the assembly of the parts 10, 12 and 14 co-axially aligned with the die cavity 21 whereupon the sheet 31 is moved relative to the plate 29 to cause its opening 33 to register with the opening 32 in the plate. The assembly of parts 10, 12 and 14 will of course then drop to the die cavity 21, whereupon the loading tray is removed.

Another biscuit 36 of Bakelite or similar material is next deposited in the upper portion of the die cavity 21 on top of the receptacle 10 and a terminal member 15 is positioned in the central opening 37 of the male die portion 25. The parts thus assembled occupy the position shown in Fig. 5.

The next step in the operation is to force the upper die plate 24 down so as to force the insulating material biscuits 35 and 36 to flow around the lightning arrester parts 10, 12 and 15, which condition is illustrated in Fig. 6, where the biscuits 35 and 36 have lost their independent identity and have become united in the form of an hermetically sealed casing 17.

The die 20 is a heated die so that the insulating material forming the casing 17 will be cured while in the die. At a temperature of 350° Fahrenheit, it will take approximately two and one-half minutes to cure the casing.

To remove the article from the die member 20, the top and bottom plates 24 and 22 are first separated from the die member 20 respectively withdrawing with them the male die portions 25 and 23. It will be understood that the said male die portions are suitably apertured to slidably receive the screw threaded terminal shank portions as illustrated and that the said male die portions may readily be withdrawn from the said terminal shanks as explained. The lightning arrester structure remaining in the die member 20 may then be knocked out through the agency of a suitable pin inserted in the opening 38 left in the die 20 by the withdrawal of the male part 23.

The form of lightning arrester illustrated in Figs. 7 and 8 embodies the same principle of construction and operation as explained above in connection with Figs. 1 to 6, inclusive, but this form is arranged to protect two aerial or line wires. The said construction embodies a porcelain or other suitable receptacle 39 which is suitably apertured and provided with terminals 40, 41 and 42 in the form of screws having their respective heads located on the inside of the receptacle. Granular material of suitable composition indicated at 43 is poured in the receptacle over the terminal heads and a metallic plate 44 is disposed on top of the granular material. A casing 45 of Bakelite or other suitable insulating material is molded around the interior assembly under pressure in substantially the same manner as above explained in connection with the molding of the structure shown in Figs. 1, 2 and 3. In the form of lightning arrester shown in Figs. 7 and 8 the central terminal 41 may constitute the ground terminal and terminals 40 and 42 may constitute aerial receiving terminals. For convenience it is preferred that the terminals 40, 41 and 42 be separated a considerable distance, which results in spacing of the terminal heads in the receptacle a distance too great to allow the jumping of electrical charge of say 500 volts from the aerial terminals to the ground terminal. By providing the plate 44 in the manner indicated, the charge may jump from the terminal 40 or 42 to the plate 44 and from the latter to the terminal 41. The jumping distances are thus reduced sufficiently to insure the desired protection. The metallic plate also serves the function of preventing migration of the granular material 43 into the material of the casing when the latter is soft during the process of molding.

The lightning arrester construction shown in Figs. 1, 2 and 3 and 7 and 8, while being exceptionally durable owing to its impervious construction and high efficiency, is nevertheless of such simple construction that it may be produced and sold at a very low cost. It is compact and small, one commercial embodiment measuring approximately one inch long and three-quarters of an inch in diameter (body dimensions) and its weight is negligible so that it may be suspended by the aerial or other line wire without auxiliary support.

Changes in the described structure may be made without departing from the spirit of the invention, the scope of which should be determined by reference to the following claims, the same being construed as broadly as possible consistent with the state of the art.

I claim:

1. A lightning arrester comprising a rigid, open-ended receptacle of insulating material, said receptacle having an aperture in its bottom wall, a terminal member projecting through said aperture and having a head portion within said receptacle, a quantity of granular material in said receptacle, another terminal having a head portion in said receptacle in opposed relation to the head of said first mentioned terminal, and a casing enclosing said receptacle and said terminal head portions and serving to cause said second mentioned terminal to compress said granular material against the head of said first mentioned terminal.

2. A lightning arrester comprising a rigid, open-ended receptacle of insulating material, said receptacle having an aperture in its bottom wall, a terminal member projecting through said aperture and having a head portion within said receptacle, a quantity of granular material in said receptacle, another terminal having a head portion in said receptacle in opposed relation to the head of said first mentioned terminal, and a casing of insulating material molded around said receptacle and portions of said terminals under pressure so as to effect compression of the granular material in said receptacle between said terminal heads.

3. The method of making a lightning arrester which consists in assembling a quantity of granular silicon carbide or like material between opposed terminals, confining said material so that it may be compressed and encased, and then molding a casing around said assembly under pressure so as to set up stresses in said casing which shall serve to hold said granular material under predetermined compression and in contact with said terminals upon completion of the molding operation.

4. In a lightning arrester, means which acts as an electrical insulator at low voltages and an electrical conductor at high voltages, terminals electrically connected to said means, and a hermetically sealed casing of insulating material which is molded about said means and within which said means is permanently contained in contact with said terminals under predetermined compressive stress induced therein during the molding operation.

5. In a lightning arrester, a quantity of a granular material which acts as an electrical insulator at low voltages and as an electrical conductor at high voltages, spaced terminals electrically connected to said quantity of granular material, and a hermetically sealed casing of insulating material which is molded about said means and within which said quantity of granular material is permanently contained in contact with said terminals under substantial compressive stress induced therein during the molding operation.

6. The method of making a lightning arrester which consists in positioning a quantity of granular material between opposed terminals in a suitable receptacle and then molding a casing around the receptacle and terminals to press said terminals into contact with said granular material with a predetermined force.

7. The method of making a lightning arrester which consists in positioning a quantity of loose, granular material in a rigid, insulating receptacle which is open at only one end thereof, closing the open end by a suitable rigid member, and then molding a casing of insulating material about said receptacle and over said rigid member so as to hold said granular material within said receptacle under predetermined compressive stress.

8. A lightning arrester comprising a rigid receptacle, a quantity of granular material in said receptacle, terminals engaging said granular material but separated from each other, and an insulating casing molded about and enclosing said receptacle, said granular material, and portions of said terminals, said casing being at all times under predetermined stress induced therein during the molding operation, and this stress being transmitted, at least in part, through said terminals to hold said granular material under predetermined stress.

9. A lightning arrester comprising a rigid, open-ended receptacle of insulating material, a quantity of granular material within said receptacle, at least two terminal members each having a portion within said receptacle in contact with said granular material, and a casing of insulating material molded about and enclosing said receptacle and said terminal members, said casing being at all times under predetermined stress induced therein during the molding operation, and being so formed that this stress is transmitted to said granular material thereby compressing said granular material and holding that material in contact with said terminals.

10. The method of making a lightning arrester of the class described which consists in depositing a quantity of granular material in a rigid insulating material receptacle in contact with a pair of terminals, and molding a casing of insulating material about said receptacle and said terminals and over said granular material content thereof under pressure, so as to trap and compress said granular material in said receptacle under predetermined stress and thereby hold said granular material in contact with said terminals at the conclusion of the molding operation.

GUSTAF E. ANDRE.